No. 787,002. PATENTED APR. 11, 1905.
L. JEAN-BAPTISTE SAVEY.
DRIVING AND CHANGE SPEED GEAR FOR VELOCIPEDES, &c.
APPLICATION FILED OCT. 26, 1903.
2 SHEETS—SHEET 1.
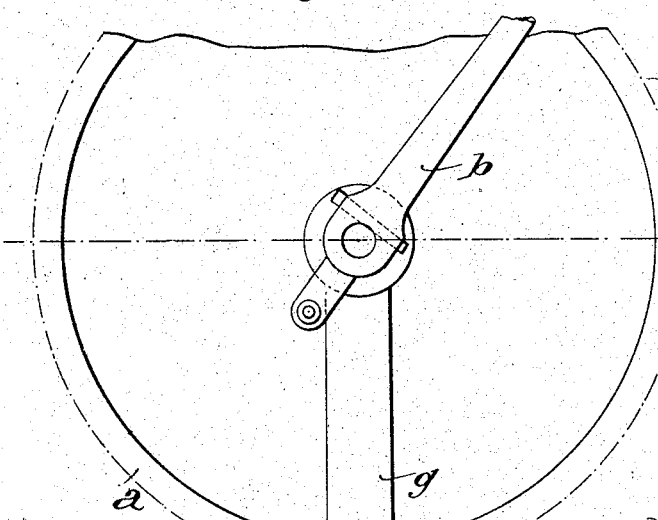
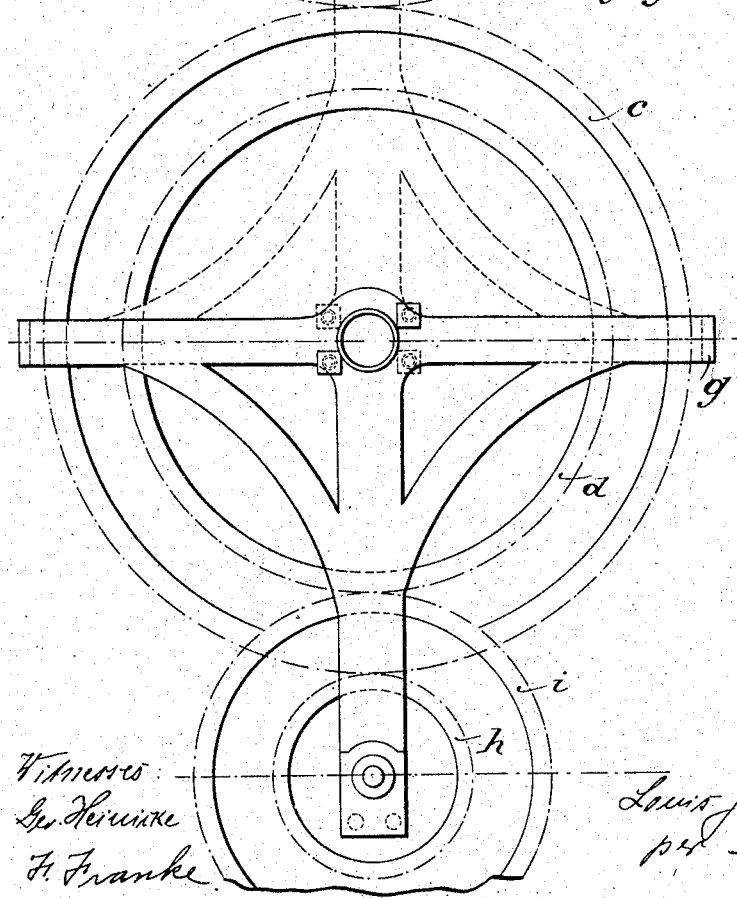

No. 787,002. PATENTED APR. 11, 1905.
L. JEAN-BAPTISTE SAVEY.
DRIVING AND CHANGE SPEED GEAR FOR VELOCIPEDES, &c.
APPLICATION FILED OCT. 26, 1903.

2 SHEETS—SHEET 2.

Witnesses:
Geo. Heinicke
F. Franke

Inventor:
Louis Jean Baptiste Savey
by G. Dittmar
Attorney

No. 787,002. Patented April 11, 1905.

UNITED STATES PATENT OFFICE.

LOUIS JEAN-BAPTISTE SAVEY, OF CHAMOUSSET, FRANCE.

DRIVING AND CHANGE-SPEED GEAR FOR VELOCIPEDES, &c.

SPECIFICATION forming part of Letters Patent No. 787,002, dated April 11, 1905.

Application filed October 26, 1903. Serial No. 178,615.

*To all whom it may concern:*

Be it known that I, LOUIS JEAN-BAPTISTE SAVEY, a citizen of the French Republic, residing at Chamousset, France, have invented certain new and useful Improvements in Driving and Change-Speed Gear for Velocipedes, &c., of which the following is a full, clear, and exact specification.

This invention relates to driving and change-speed gear for velocipedes and the like, and has for its object to provide a change-speed gear by means of five gear-wheels which serve at the same time as the driving mechanism, whereby the movement of the pedals is transmitted to the back wheel of the velocipede or like vehicle. The first gear-wheel is secured upon the crank-shaft and drives, through two intermediate gears mounted on a sliding sleeve, the smaller or the larger of two further gears of different diameters, which are adapted to actuate the rear wheel of the vehicle at different speeds.

Figure 3:
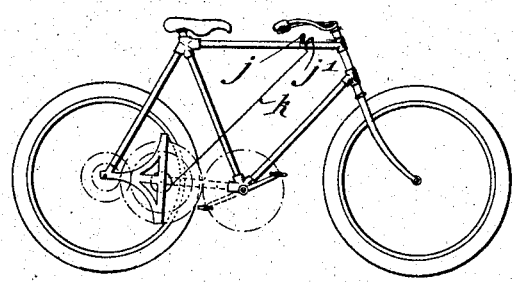
Figures 4, 5:
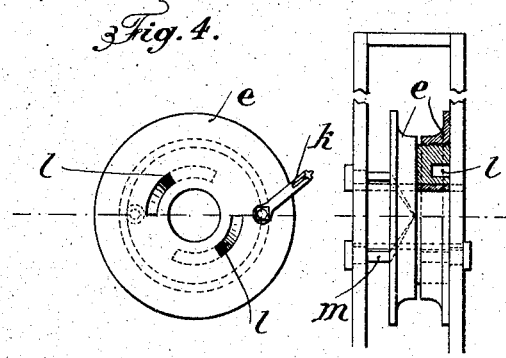
Figure 6:
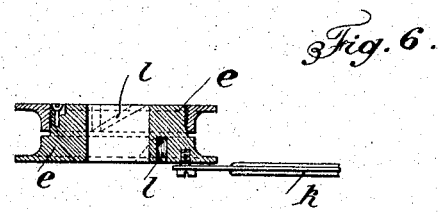

In the accompanying drawings, illustrating my invention, Figure 1 is an elevation of the gear-wheels. Fig. 2 is a plan view, partly in section; and Fig. 3 shows in elevation a bicycle provided with the improved gear. Figs. 4, 5, and 6 show in detail views the sliding sleeve with the intermediate gears.

The first gear-wheel $a$ is connected to one of the cranks $b$ and is in constant engagement with a second gear $c$, which is connected to the third, $d$, the two latter loosely revolving on ball-bearings on an intermediate sliding sleeve $e$, which can itself rotate loosely on a tube $f$, secured to the fork $g$, connecting the crank-brackets to the axle of the rear wheel. The sleeve $e$ can be displaced longitudinally on the tube $f$ in such a manner that when the gear-wheel $c$ is in mesh with the fourth gear $h$, driving the rear wheel of the vehicle, the gear $d$ will be out of engagement with the gear $i$, which is connected to the gear $h$, or, reversely, when $d$ and $i$ are in mesh $c$ and $h$ will be out of engagement.

The two gear-wheels $h$ and $i$ rotate on rollers or balls disposed in any known or usual manner. The wheel $h$ is preferably a toothed ring, driven upon the hub of wheel $i$ so tight that it is taken along by friction, but that it may slip for the short while of shifting the sleeve when all four wheels $c$, $d$, $h$, and $i$ are in mesh. The gear-wheel $a$ is sufficiently wide so that its teeth be always in gear with those of the gear-wheel $c$ no matter that the sleeve with the intermediate gears be shifted to either end of its play.

The axial displacement of the intermediate sleeve, which by the disengagement of two gears and the engagement of the two adjacent gears, as explained, assures the change of speed in a manner well known, is produced by a controlling hand-lever $j$, connected to the sleeve by a rod $k$, which may be turned by the rider into either of the positions $j'$ or $j''$, (shown in Fig. 3,) thereby giving to said sleeve a turn of about ninety degrees.

The sleeve $e$ consists of two parts screwed one to the other, as shown, and is provided with two inclined planes or sloping grooves $l$, diametrically opposite each other and preferably on opposite sides. Bolts $m$, secured to the frame, enter the grooves $l$, so that by giving a short turn to the sleeve by means of rod $k$ and handle $j$ it is compelled to slide axially upon the tube $f$, owing to the inclines $l$ being in contact with the bolts $m$.

This system of changing the speed facilitates the ascent of the steepest hills. The mechanism cannot get out of order, and the taking apart of the same can be accomplished in all cases instantaneously. Preferably the series of gear-wheels should be protected by a light casing made in two pieces, so that it may easily be removed.

Having thus described the nature of my said invention, what I claim as new, and desire to secure by Letters Patent, is—

Driving and change-speed gear for velocipedes and the like, comprising a driving gear-wheel, a crank-shaft carrying said wheel, a pinion on the rear wheel of the vehicle, intermediate gears, one larger than the other, alternately in mesh with said pinion and the larger one in constant mesh with the driving-wheel, an intermediate sleeve $e$ movable axially, a tube $f$ serving as a guide for said sleeve in its axial displacements, a fork $g$, of the cycle carrying the tube $f$, said sleeve carrying revolubly the intermediate gears, inclined slots in said sleeve, pins or bolts secured to the frame being adapted to engage said slots, and means to give a short turn to said sleeve, substantially as described and for the purpose set forth.

In witness whereof I have hereunto set my hand in presence of two witnesses.

LOUIS JEAN-BAPTISTE SAVEY.

Witnesses:
PIERRE GALON,
JOSEPH BEVY.